US004001772B2

United States Statutory Invention Registration [19]

[11] Reg. Number: H1772

Akahane [45] Published: Jan. 5, 1999

[54] SYSTEM AND METHOD FOR TRANSMITTING INFORMATION FROM A PAGING DEVICE TO A RECEIVER

[75] Inventor: Masaaki Akahane, Mahwah, N.J.

[73] Assignees: Sony Corporation, Tokyo, Japan; Sony Electronics Inc., Park Ridge, N.J.

[21] Appl. No.: 543,598

[22] Filed: Oct. 16, 1995

[51] Int. Cl.[6] ..... G08B 1/00

[52] U.S. Cl. ..... 340/825.22; 340/825.07; 340/825.44; 379/56.1; 379/56.3; 455/67.7; 455/68; 455/70

[58] Field of Search ..... 340/825.22, 825.07, 340/825.44; 455/67.7, 68, 70; 379/56, 57, 58, 56.1, 56.3

[56] References Cited

U.S. PATENT DOCUMENTS

| | | | |
|---|---|---|---|
| 4,995,099 | 2/1991 | Davis | 455/343 |
| 5,311,570 | 5/1994 | Grimes et al. | 379/57 |
| 5,418,524 | 5/1995 | Fennell | 340/825.22 |
| 5,479,408 | 12/1995 | Will | 370/94.1 |
| 5,590,396 | 12/1996 | Henry | 455/33.1 |

FOREIGN PATENT DOCUMENTS

| | | |
|---|---|---|
| 0 426 966 A2 | 5/1991 | European Pat. Off. . |
| 2220290 | 1/1990 | United Kingdom . |

OTHER PUBLICATIONS

1996 Radio Shack Catalog, "Local and Nationwide Pagers", p. 25.

Telecom Sources, Oct., 1995, "Value–Loaded Pagers, Low Prices Prices Create Buyer's Market".

*Primary Examiner*—Bernarr E. Gregory

*Attorney, Agent, or Firm*—Lise A. Rode; Jerry A. Miller

[57] ABSTRACT

A system and method of displaying incoming pager messages on a receiver using infrared signals. The paging device includes a receiver for receiving paging signals including paged information. The output signal from the receiver is supplied to a baseband processor where it is converted into a digital signal, under the control of a processor. If the thus digitized signal is determined to be the selecting signal for the particular paging receiver, the digital signal is then preferably sent directly to a protocol translator, where it is converted into a signal having an infrared protocol. After processing in the protocol translator, the signal is then sent to a transmitter and transmitted as an infrared signal. The infrared signal is then received in a light-receiving element in a receiver where it is thereafter decoded by a protocol decoder in accordance with instructions contained in a memory connected thereto to retrieve the paging signal or paged message. The receiver has a display for displaying the decoded information and preferably has an indicator for confirming receipt of the infrared signals in the receiver.

23 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM AND METHOD FOR TRANSMITTING INFORMATION FROM A PAGING DEVICE TO A RECEIVER

BACKGROUND OF THE INVENTION

1. Field of Invention

This invention relates to the field of personal communication devices. More particularly, this invention relates to a system and method for transmitting information from a paging device to a receiver such as a PDA (personal digital assistant).

2. General Background

Personal communication devices have become quite popular in the recent past. Paging devices, in particular, have become popular given their compact size, ease of use and relatively low cost. One problem which is pervasive with paging devices, however, is that as these devices have a high battery drain, the battery life of a pager under continuous use is often on the order of a few months. One of the elements of the pager which accounts for a significant amount of this energy consumption is the pager display which is used to display incoming messages. Efforts have been made to find alternatives to displaying incoming pager messages on the pager display in order to assist in conserving the battery life. Another perhaps even more pervasive problem is the difficulty in viewing a large amount of text given the compact size of the device and therefore, the display.

One such alternative is to provide the paging device with a PCMCIA connector which may be disposed in a PCMCIA slot within a receiving device; most commonly, a PDA (personal digital assistant) such as Sony Corporation's personal intelligent communicator, the Magic Link PIC-1000, which may be purchased from Sony Electronics Corporation, 1 Sony Drive, Park Ridge, N.J. 07656. In operation, the pager user connects the PCMCIA connector of the pager device into the PCMCIA slot of the receiving device. Through the firmware built into the device, and under the control of the processor housed therein, the incoming paging messages are caused to be displayed on the receiving device display instead of the pager display. As a result, battery drain which would normally occur as a result of displaying messages on the pager is significantly reduced or eliminated altogether. Additionally, and perhaps more importantly the generally larger display area available on the PDA allows the user to view more of the incoming message at one time. One significant disadvantage with this alternative, however, is that PDA receiving devices have a limited available number of PCMCIA slots, and it is often more desirable to leave these few slots available for use with other applications such as for connection to an external hard disk drive or for the installation of additional application software.

Accordingly, it is one object of the invention to provide a system and method of displaying incoming paging messages without causing a high battery drain from the paging device.

It is also an object of the invention to provide a system and method of displaying incoming pager messages on a receiver with a display.

It is an additional object of the invention to provide a system and method of displaying more of an incoming message so that it is easier for the user to view more of such message.

It is another object of the invention to provide a system and method of displaying pager messages on a receiver having a display without using one of the limited number of PCMCIA slots available on the receiver.

SUMMARY OF THE INVENTION

Therefore, in accordance with one object of the invention, there is provided a system and method of displaying incoming pager messages on a receiver having a display using infrared signals. The paging device includes an RF receiver for receiving paging signals including paged information. The RF receiver provides an output signal to a baseband signal processor unit where it is then converted into a digital signal. If the thus digitized signal is determined to be the selecting signal for the particular paging receiver, the processed signals are then sent to a protocol translator, where the paging signals are converted are into signals having an infrared protocol in accordance with instructions from a memory connected to the protocol translator. After processing in the protocol translator, the signals, including the information, are then sent to a transmitter connected to the protocol translator and are thereafter transmitted as infrared signals.

In accordance with another aspect of the invention, these infrared signals are received in a light-receiving element in a receiver having a display, such as a PDA, where they are thereafter processed by a protocol decoder in accordance with instructions contained in a memory connected thereto. In accordance with these instructions, the protocol decoder demodulates the infrared signal protocol to retrieve the paging signal or paged message. The receiver preferably has a display for displaying the decoded information and an indicator for confirming receipt of the infrared signals in the receiver.

DETAILED DESCRIPTION OF THE PREFERRED EMBODIMENT

An embodiment of the system and method for transmitting information from a paging device to a receiving device having a display will now be described in detail with reference to the accompanying drawings.

Figure 1A:
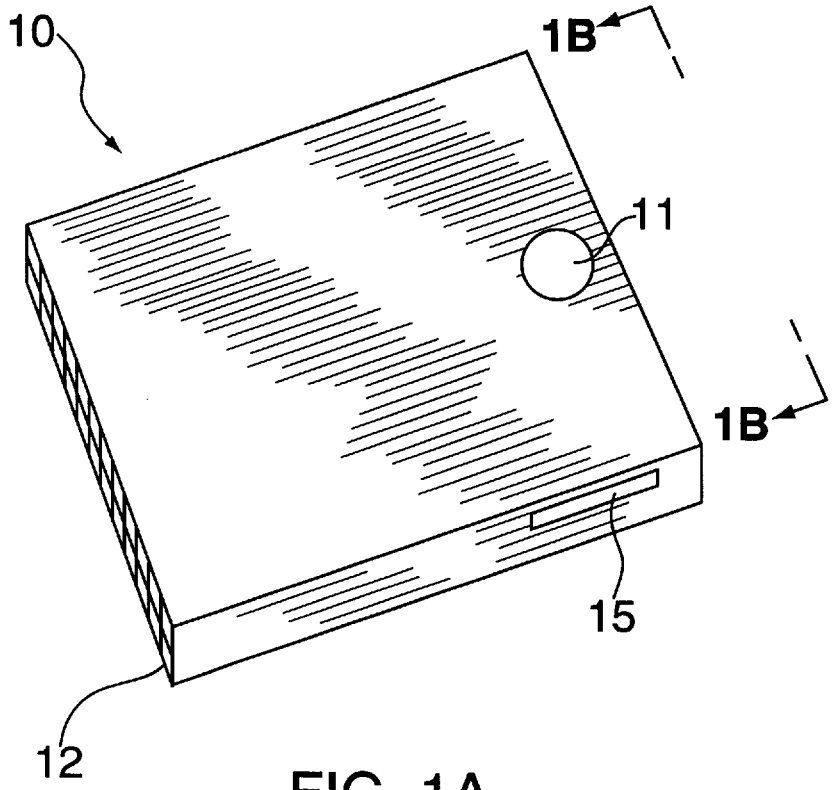
FIG. 1*a* shows a perspective view of a preferred embodiment of the paging device of the present invention.
Figure 1B:
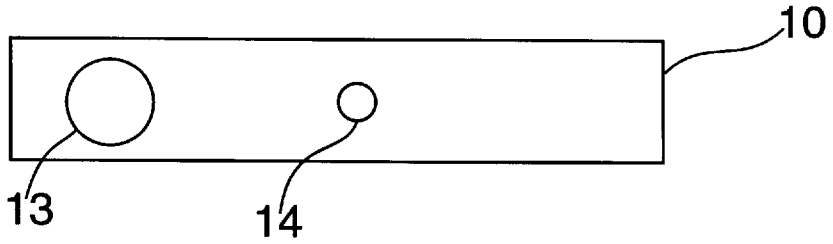
FIG. 1*b* shows a side elevational view of the paging device of FIG. 1*a* along the line 1*b*—1*b*.

As seen in FIGS. 1*a* and 1*b*, a paging device, or pager card 10, is provided with a light-emitting element 14, such as an infrared diode. A transmitting button 11 is also disposed in said device. In one embodiment, the paging device 10 also preferably has a PCMCIA connector 12 for insertion into a PCMCIA slot in a receiver. Preferably, the paging device 10 also includes a paging device battery 15, and a message incoming indicator light 13, which confirms the arrival of the paging signals in the paging device 10. As will be described later with respect to FIG. 3, a receiving device of one embodiment of the system has a photodiode 46 for receiving incoming infrared signals from the paging device 10.

Figure 2:
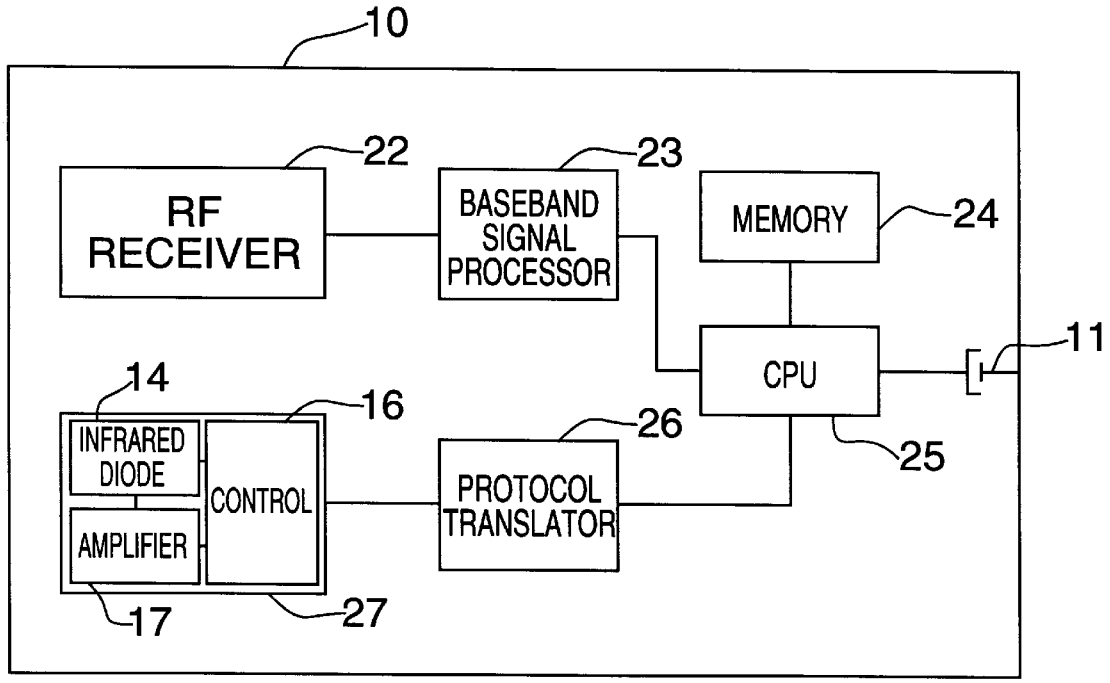
FIG. 2 shows a block diagram of a preferred embodiment of the paging device of the present invention.

Referring to FIG. 2, a block diagram of a preferred embodiment of the paging device 10 is shown. (Although the paging device shown therein is a digital pager, it will be appreciated that the present invention is not so limited, and the paging device 10 may instead constitute an analog pager). Paging signals transmitted over the PCS system are received from a terrestrial tower or satellite into the paging device 10 through a receiving antenna (not shown). The received paging signals, which are generally FSK-modulated for digital pagers, are then received in the RF receiver 22, where, as known in the art, they are amplified, tuned, and mixed with an injection frequency in order to create an intermediate frequency (IF) signal and ultimately converted to a baseband signal. The output signal of the RF receiver 22 is then supplied to a baseband signal processor unit 23 where, as known in the art, the signals are converted into a digital signal, under the control of a processor 25, which is preferably a CPU. If the thus digitized signal is determined to be the selecting signal for the particular paging receiver, the digital signal is normally then coded for display on the paging device's 10 display (not shown). However, in accordance with the present invention, if it is determined that the selecting signal for the paging device 10 has been received, the processed signal is then preferably sent directly to a protocol translator 26, where the paging signals are converted are into signals having an infrared protocol. In accordance with the present invention, the processor 25 controls the protocol translator 26 for translating the protocol format of incoming paging signals from a paging protocol to an infrared format (discussed below). The processor is connected to a memory 24, preferably RAM and ROM, wherein the processor performs on the RAM the aforementioned protocol translation. The processor 25 may also interrogate the ROM which generally contains the instructions necessary to operate the processor 25 to perform the aforementioned operations. (Additionally, although not shown in FIG. 1, and though not directly relevant to the present invention, it will be understood that the paging device 10 also preferably includes a low frequency amplifier connected to receive the output from the decoder and a loudspeaker connected to the low frequency amplifier. When it is determined that the appropriate selecting signal for the paging device 10 have been selected, the low frequency amplifier is driven so that its output in turn drives the loudspeaker, which produces a calling tone or signal. This calling tone will be produced preferrably in conjunction with the activation of incoming message indicator 13. Alternatively, other alerting elements known in the art, such as a buzzer or the like, may be used by themselves or in conjunction with the incoming message indicator 13.)

As discussed above, once the signal is decoded and digitized, and determined to be the selecting signal for paging device 10, it is then supplied to the protocol translator 26. Using the memory 24, the translator 26 receives the bit sequence of the digitized signal. The translator 26 modulates a digital signal of predetermined frequency or frequencies with this carrier signal to produce a command signal. This command signal is then supplied to an infrared transmitter module 27, which preferably comprises a light-emitting element 14, such as an infrared diode, and a controller 16 which controls the operation of the light-emitting element 14. The command signal is then amplified by an amplifier 17 included in the infrared transmitter module 27, converted into infrared rays by the light-emitting element 14, and then transmitted therefrom, preferably upon activation of the transmitting button 11 by the paging device user. However, it will be understood that in alternate embodiments, transmission of the infrared signal could be effected automatically. That is, the processor 25 of the paging device 10 could provide a clock signal to control the infrared transmitter module 27 to automatically transmit the infrared signal upon the predetermined or user-definable time has elapsed after the receipt and processing of the paging signal. The paging device 10 could also be provided with a automatic transmission override button which would allow the user to override the automatic transmission option. In such a case, the incoming paging signal would be coded for display on the paging device's 10 display (not shown) and then displayed on the paging device 10 display. The displayed message could then be edited and then transmitted to the receiving device 30 by activation of the transmitting button 11.

Figure 3:
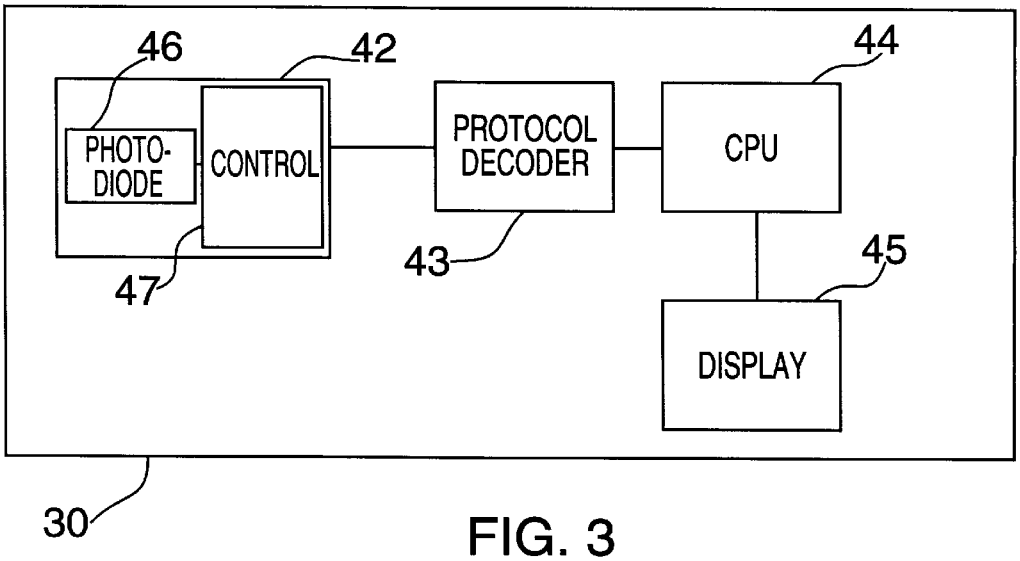
FIG. 3 shows a block diagram of a preferred embodiment of the receiving device of the present invention.

In the preferred embodiment, the infrared signal which has been transmitted from the paging device 10, may then be received by a receiving device, such as a PDA, one embodiment of which is shown in FIG. 3. In this embodiment, the infrared signal is received through an antenna (not shown) into an infrared receiver 42. This receiver 42 generally includes a light-receiving element, such as a photodiode 46, and a control unit 47 which controls the operation of the photodiode 46. Under the control of the control unit 47, the photodiode 46 converts the infrared signal into an electrical signal, which is then supplied to a protocol decoder 43 connected to the infrared receiver 42. The protocol decoder 43, under the control of the receiver processor 44, which is preferably a CPU, demodulates the signal to retrieve the paging signal data or paged message. The decoded message is then displayed on the receiving device's display 45, which is also under the control of the receiving device's processor 44. Additionally, the receiving device 30 may include a message received indicator (not shown), such as an LED, which will be activated when a message has been successfully transmitted from the paging device 10 to the receiving device 30.

Figure 4A:
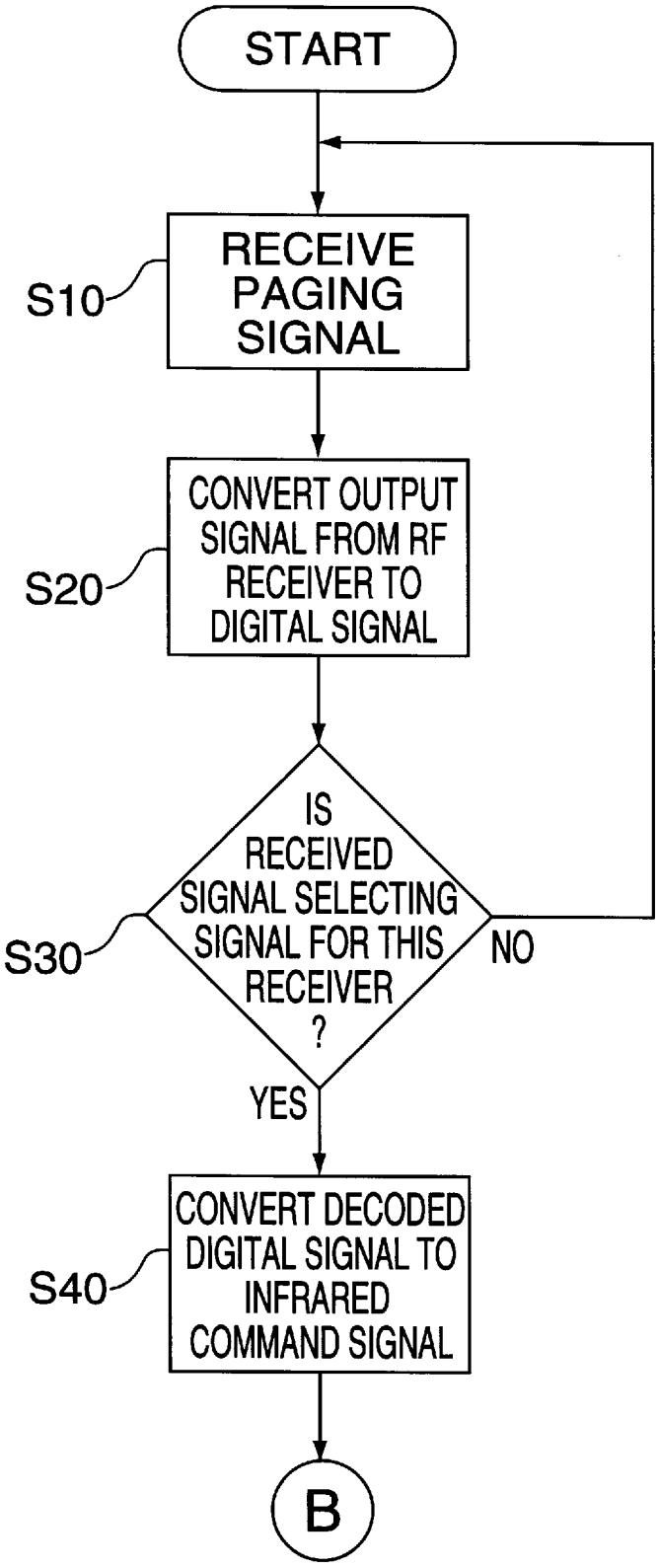
FIG. 4*a*–4*b*, 5 show a flowchart of the preferred method of transmitting information from the paging device of the preferred embodiment to a receiving device.
Figure 4B:
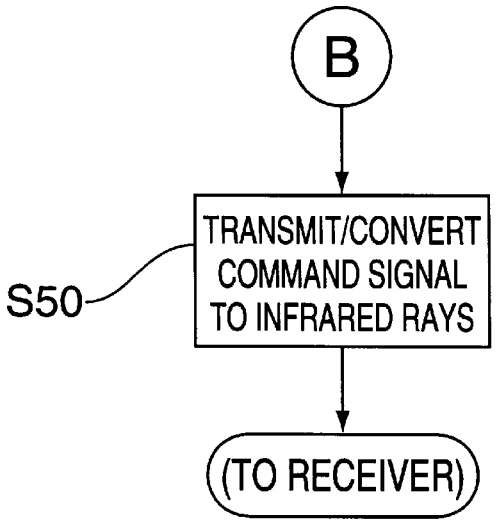

Referring to FIGS. 4*a* and 4*b*, operation of the system of the present invention will now be described. As seen in FIG. 4*a*, at step S10, a paging signal, including data and/or other information, and having a first protocol, is received through an antenna into a paging device 10 where the received signal is tuned, amplified, and mixed with an injection frequency in order to create an IF signal. At step S20, the output signal from the RF receiver is then converted into a digital signal. If it is determined at step S30 that the received and now converted signal is the selecting signal for this particular paging device 10, the digital signal is then by the protocol translator 26 at step S40 to a command signal having an infrared format. At step 50, this command signal is then converted into infrared rays in the infrared transmitter 27 and transmitted therefrom preferably upon activation of the transmitting button 11 by the paging device user.

Figure 5:
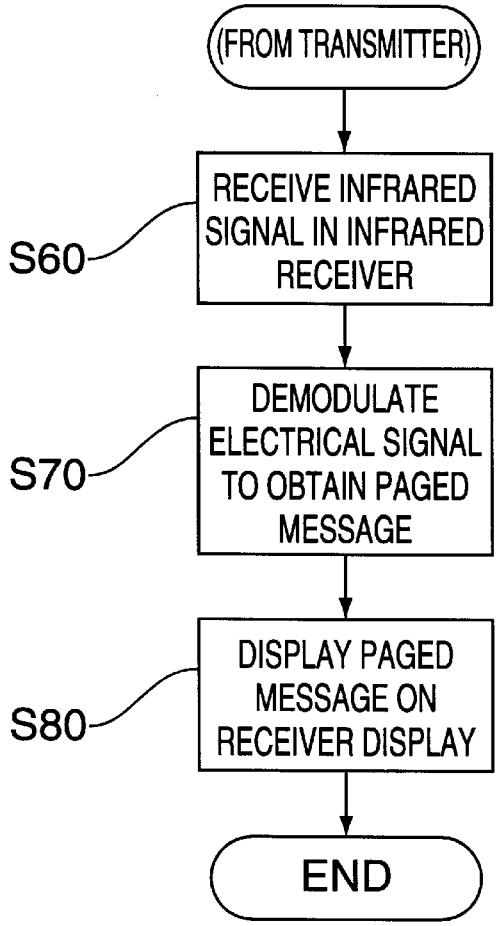

This infrared signal may then be received in the infrared receiver 42 of a receiving device having a receiver, such as a PDA at step S60 (FIG. 5), where the signal is converted from an infrared signal to an electrical signal by the light-receiving element (e.g., a photodiode) included in the infrared receiver 42. This signal is then provided at step S70 to the protocol decoder 43 where, under the control of the receiving device's processor 44, it is demodulated to retrieve the paging data/message. The decoded message is then displayed on the receiving device's display 45 (step S80).

Thus it will be appreciated that the above described system and method provides for the transmission of incoming paging messages from a paging device to a receiving device such as a PDA and for the display of such messages on the receiving device's display, instead of the paging device's display. As such, high battery drain from the paging device is reduced and the limited PCMCIA slots available on the receiving device are not needlessly used.

It is further apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. For example, the receiving device 30 may constitute a TV receiver and the receiver display 45 a TV screen. Alternatively, the receiver 30 and receiver display 45 may respectively comprise any other receiver and monitor which have the capability of decoding the incoming infrared signal so that it may be displayed. Additionally, while, in the present invention, the infrared signal is only transmitted upon activation of a transmitting button 11, it will again be understood that the paging device 10 could be adapted for automatic transmission of an incoming paging a preset or user-definable time after the receipt and processing of the incoming paging signal. The paging device 10 could also be provided with an automatic transmission override button which would allow the user to override the automatic transmission option, and display the message on the pager display and/or edit the message and then transmit the message to the receiving device 30 by activation of the transmitting button 11. Furthermore, while in the preferred embodiment, the paging device includes a PCMCIA adapter, so that if the user so desires, he may connect the paging device into a PCMCIA slot in the receiving device, it will be understood that such element is not necessary to the present invention, and may be eliminated in alternate embodiments. Likewise, the message received indicator device may be eliminated from alternate embodiments of the present invention, or may comprise alternate devices to confirm the receipt of the infrared signal by the receiving device, such as an audible alarm, or a combination of audible alarm and LED. Other embodiments will occur to those skilled in the art. Accordingly, it is intended that the present invention embrace all such alternatives, modifications and variations as fall within the scope of the appended claims.

What is claimed is:

1. A method sending information including messages from a paging device to a receiver, comprising the steps of:

receiving a radio frequency signal including said information in said paging device;

converting said radio frequency signal into an infrared signal; and, transmitting said infrared signal including said information from said paging device to said receiver.

2. The method of claim 1, wherein said receiver has a photodiode, further comprising the step of:

receiving said infrared signal at said photodiode.

3. The method of claim 1, wherein said radio frequency signal has a first protocol and said infrared signal has a second protocol, and wherein said converting step comprises translating said radio frequency signal protocol through a protocol translator to provide said infrared signal protocol.

4. The method of claim 1, wherein said receiver comprises a personal digital assistant.

5. The method of claim 1, wherein said receiver comprises a television receiver.

6. The method of claim 1, wherein said receiver comprises a monitor.

7. The method of claim 1, wherein said receiver further includes a display, said method further comprising the step of:

displaying said information on said display of said receiver.

8. The method of claim 1, wherein said receiver further includes receiver indicator means, said method further comprising the step of:

activating said receiver indicator means upon receipt of said infrared signal.

9. A method of sending information including messages included in a radio frequency signal from a paging device to a receiver, comprising the step of:

transmitting an infrared signal including said information from said paging device to said receiver;

receiving said radio frequency signal including said information into said paging device; and, converting said radio frequency signal into said infrared signal.

10. The method of claim 9, wherein said transmitting step automatically occurs at a preselected time after receipt of said radio frequency signal.

11. The method of claim 9, wherein said paging device includes a transmitting button and wherein said transmitting step occurs in response to actuation of said transmitting button.

12. A paging device for communicating with a receiver, comprising:

receiving means for receiving paging signals including messages and other information, said paging signals having a first protocol;

protocol translating means for translating said paging signals into infrared signals having a second protocol; and, transmitting means for transmitting said infrared signals to said receiver.

13. The paging device of claim 12, wherein said transmitting means comprises an infrared diode.

14. A paging device for communicating with a receiver, comprising:

receiving means for receiving paging signals including messages and other information, said paging signals having a first protocol;

protocol translating means for translating said paging signals into infrared signals having a second protocol;

means to determine a period of time after receipt of said paging signals; and, automatic transmitting means responsive to said determining means for transmitting said infrared signals to said receiver after said period of time.

15. A paging device for communicating with a receiver, comprising:

a receiver for receiving paging signals including messages and other information, said paging signals having a first protocol;

a protocol translator for translating said paging signals into infrared signals having a second protocol; and, a transmitter for transmitting said infrared signals to said receiver.

16. A system for transmitting paging signals to a receiver, comprising:

receiving means for receiving paging signals including messages and other information, said paging signals having a first protocol;

protocol translating means for decoding said paging signals protocol into infrared signals having a second protocol;

transmitting means for transmitting said infrared signals to said receiver;

infrared receiving means in said receiver for receiving said infrared signals; and, protocol decoder means in said receiver for decoding said second protocol of said infrared signals.

17. The system of claim 16, further comprising:

display means for displaying said information.

18. The system of claim 16, further comprising:

indicator means for indicating when said infrared signals have been received in said receiver.

19. The system 16, wherein said infrared receiving means comprises a photodiode.

20. The system of claim 18, wherein said received indicator means comprises an audio signal.

21. The system of claim 18, wherein said received indicator means comprises an LED.

22. The paging device of claim 16, wherein said paging device also has a PCMCIA connector for connection to a PCMCIA port in said receiver.

23. A system for transmitting paging signals to a receiver, comprising:

a receiver for receiving paging signals including messages and other information, said paging signals having a first protocol;

a protocol translator means for decoding said paging signals protocol into infrared signals having a second protocol;

a transmitter for transmitting said infrared signals to said receiver;

an infrared receiving device in said receiver for receiving said infrared signals; and, a protocol decoder in said receiver for decoding said second protocol of said infrared signals.

* * * * *